(12) United States Patent
Iacona (10) Patent No.: US 7,913,401 B2
(45) Date of Patent: Mar. 29, 2011

(54) THREE-IN ONE TRIMMER HEAD (75) Inventor: Fernando R. Iacona, Paradise Valley, AZ (US)

(73) Assignee: Kwik Products, Inc., Phoenix, AZ (US)

( * ) Notice: Subject to any disclaimer, the term of this patent is extended or adjusted under 35 U.S.C. 154(b) by 796 days.

(21) Appl. No.: 11/825,780

(22) Filed: Jul. 9, 2007

(65) Prior Publication Data

US 2008/0010836 A1   Jan. 17, 2008

Related U.S. Application Data (60) Provisional application No. 60/830,372, filed on Jul. 12, 2006.

(51) Int. Cl.
*B26B 27/00* (2006.01)
(52) U.S. Cl. .......................... 30/275.4; 30/276
(58) Field of Classification Search ............... 30/276, 30/275.4, 288, 329
See application file for complete search history.

(56) References Cited

U.S. PATENT DOCUMENTS

| | | | | | |
|---|---|---|---|---|---|
| 4,058,959 | A | * | 11/1977 | Moss et al. | 56/295 |
| 4,229,933 | A | * | 10/1980 | Bernard | 56/295 |
| 4,461,138 | A | * | 7/1984 | Whitman | 56/12.7 |
| 4,856,194 | A | * | 8/1989 | Lee | 30/276 |
| 5,170,561 | A | * | 12/1992 | Sepke | 30/276 |
| 5,303,476 | A | * | 4/1994 | Tuggle | 30/347 |
| 5,430,943 | A | * | 7/1995 | Lee | 30/347 |
| 5,617,636 | A | * | 4/1997 | Taggett et al. | 30/276 |
| 5,622,035 | A | * | 4/1997 | Kondo et al. | 56/12.7 |
| 5,640,836 | A | * | 6/1997 | Lingerfelt | 56/255 |
| 5,722,172 | A | * | 3/1998 | Walden | 30/347 |
| 5,758,424 | A | * | 6/1998 | Iacona et al. | 30/347 |
| 5,791,054 | A | * | 8/1998 | Bessinger | 30/276 |
| 5,845,405 | A | * | 12/1998 | Rosdahl | 30/276 |
| 5,852,876 | A | * | 12/1998 | Wang | 30/276 |
| 5,887,349 | A | * | 3/1999 | Walden | 30/347 |
| 5,890,352 | A | * | 4/1999 | Molina | 56/12.7 |
| 5,896,666 | A | * | 4/1999 | Iacona et al. | 30/276 |
| 5,979,064 | A | * | 11/1999 | Kitz et al. | 30/347 |
| 6,108,914 | A | * | 8/2000 | Sheldon | 30/276 |
| 6,112,416 | A | * | 9/2000 | Bridges et al. | 30/276 |
| 6,119,350 | A | * | 9/2000 | Sutliff et al. | 30/276 |
| RE36,940 | E | * | 11/2000 | Fogle | 30/276 |
| 6,347,455 | B2 | * | 2/2002 | Brant et al. | 30/276 |
| 6,349,475 | B1 | * | 2/2002 | Buck | 30/276 |
| 6,357,215 | B1 | * | 3/2002 | Thorne | 56/295 |
| 6,415,585 | B2 | * | 7/2002 | Morabit et al. | 56/12.7 |
| 6,427,341 | B1 | * | 8/2002 | Lee | 30/347 |

(Continued)

*Primary Examiner* — Kenneth E. Peterson
*Assistant Examiner* — Sean Michalski
(74) *Attorney, Agent, or Firm* — Gerald E. Hespos; Michael J. Porco (57) ABSTRACT

A three-in-one cutting head for a rotary trimmer usable with discrete lengths of string, flail blades, and fan blades is provided. The present disclosure represents an improvement over presently existing multi-purpose trimmer heads in that there is no requirement for the trimmer head to be disassembled in order to change the different blades or strings. The cutting head being selectively rotationally driven through a drive shaft includes a generally cylindrical body having first and second pairs of diametrically opposed apertures disposed on a periphery of the body; at least one clamping member disposed in the body adjacent to each aperture of the first diametrically opposed pair configured for releasably retaining at least one cutting string; and at least one holding member disposed in the body adjacent to each aperture of the second diametrically opposed pair configured for releasably retaining at least one blade.

12 Claims, 8 Drawing Sheets

U.S. PATENT DOCUMENTS

| | | | |
|---|---|---|---|
| 6,519,857 B1 * | 2/2003 | Proulx et al. | 30/276 |
| 6,581,292 B2 * | 6/2003 | Allis | 30/276 |
| 6,601,373 B1 * | 8/2003 | Legrand | 56/12.7 |
| 6,668,462 B2 * | 12/2003 | Skinner et al. | 30/347 |
| 6,817,102 B2 * | 11/2004 | Harris et al. | 30/276 |
| 6,834,486 B2 * | 12/2004 | Thompson et al. | 56/255 |
| 6,842,984 B1 * | 1/2005 | Grant et al. | 30/276 |
| 6,912,789 B2 * | 7/2005 | Price, III | 30/276 |
| 2002/0194829 A1 * | 12/2002 | Petersen et al. | 56/255 |

\* cited by examiner

THREE-IN ONE TRIMMER HEAD

PRIORITY

This application claims priority to an application entitled "THREE-IN-ONE TRIMMER HEAD" filed in the United States Patent and Trademark Office on Jul. 12, 2006 and assigned Ser. No. 60/830,372, the contents of which are hereby incorporated by reference.

BACKGROUND

1. Field

The present disclosure relates to cutting heads for rotary trimmers and, more specifically, to a three-in-one rotary trimmer head usable with discrete lengths of string, flail blades, and fan blades. The present disclosure represents an improvement over presently existing multi-purpose trimmer heads in that there is no requirement for the trimmer head to be disassembled in order to change the different blades or strings.

2. Description of the Related Art

Applicant is the inventor of U.S. Pat. Nos. 5,758,424 and 5,896,666, the disclosures of which are incorporated in their entirety by reference in this application. Applicant's inventions of U.S. Pat. Nos. 5,758,424 and 5,896,666 are directed to a cutting head for a string trimmer which accommodates any string gauge thickness and which may be easily and quickly re-threaded upon failure of the string previously disposed therein. Clamping members are provided to clamp the strings within the cutter head, with the clamping force being provided by springs and augmented by centrifugally generated moments. The clamping members are capable of generating two degrees of clamping force. The lesser degree of clamping force can be overcome by a string forceably inserted into the cutting head.

The cutting heads of applicant's U.S. Pat. Nos. 5,758,424 and 5,896,666 operate in an efficient and smooth manner, however, they are only capable of accommodating discrete strings.

There is a need for a cutting head which can accommodate different types of cutting members, such as flail blades, discrete strings, and fan blades. Fan blades are used for purposes of generating a blowing force for removing debris from sidewalks or walkways. Flail blades are used for cutting thick vegetation, as well as tall vegetation. String cutters are used to cut low vegetation, for edging vegetation areas, and for cutting vegetation near walls or other hard structures. There is also a need for a universal type trimmer head which can be rapidly and easily converted from one type of cutting means or fan blade means into a different structure depending on the work to be accomplished at that time.

There are in existence various trimmer heads which can accommodate different types of blades, such as a flail blade and a fan blade, however, those devices are cumbersome and require disassembly of the head in order to change from one type of blade to another type of blade. Hence, they are difficult to operate and time consuming in changing from one embodiment to a different embodiment.

The present disclosure overcomes the shortcomings of the prior art and provides a trimmer head which is capable of easily and quickly being converted from one type of blade structure to a different type of blade structure, without requiring disassembly of the head.

SUMMARY

A three-in-one cutting head for a rotary trimmer usable with discrete lengths of string, flail blades, and fan blades is provided. The present disclosure represents an improvement over presently existing multi-purpose trimmer heads in that there is no requirement for the trimmer head to be disassembled in order to change the different blades or strings.

According to one aspect of the present disclosure, a cutting head for a rotary trimmer, the cutting head being selectively rotationally driven through a drive shaft is provided. The cutting head includes a generally cylindrical body having first and second pairs of diametrically opposed apertures disposed on a periphery of the body; at least one clamping member disposed in the body adjacent to each aperture of the first diametrically opposed pair configured for releasably retaining at least one cutting string; and at least one holding member disposed in the body adjacent to each aperture of the second diametrically opposed pair configured for releasably retaining at least one blade. The at least one blade is a flail blade or a fan blade.

In another aspect, the at least one holding member includes a post for rotatably engaging the at least one blade, wherein the at least one blade includes a U-shaped clamping portion configured to engage the post.

In a further aspect, a sleeve disposed on the post configured to facilitate rotation of the at least one blade, wherein the U-shaped clamping portion engages the sleeve in a snap fit.

In another aspect, the first and second pairs of diametrically opposed apertures are equally spaced along the periphery of the body.

According to a further aspect of the present disclosure, the at least one clamping member is a cam configured to contact a pressing wall. The cam is biased to contact the pressing wall by a spring.

In yet another aspect, each of the at least one clamping member is disposed in a clamp housing, the clamp housing being rotatable about an axis extending generally perpendicular to the body.

BRIEF DESCRIPTION OF THE DRAWINGS

The above and other aspects, features and advantages of the present disclosure will become more apparent in light of the following detailed description when taken in conjunction with the accompanying drawings in which.

DETAILED DESCRIPTION

Preferred embodiments of the present disclosure will be described hereinbelow with reference to the accompanying drawings. In the following description, well-known functions or constructions are not described in detail to avoid obscuring the present disclosure in unnecessary detail.

Figure 1:
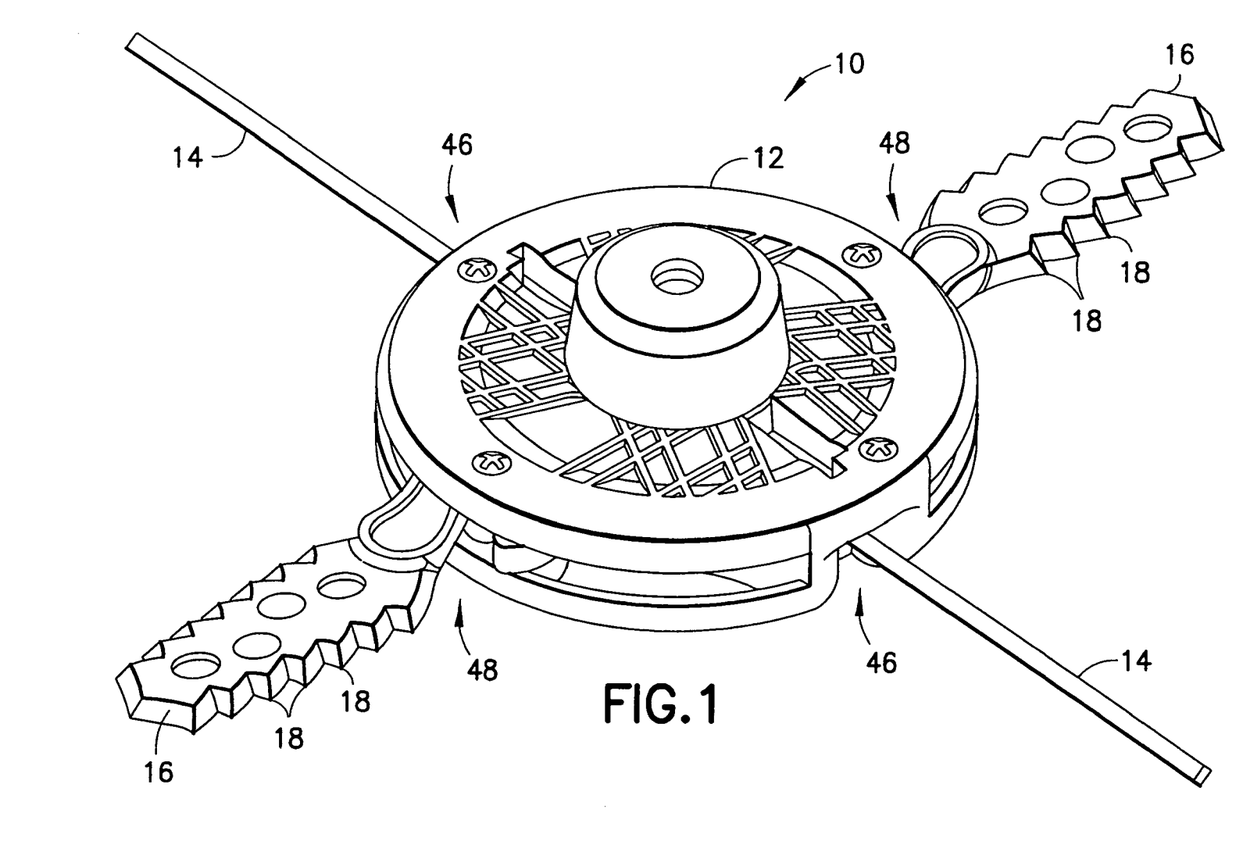
FIG. 1 is a perspective view of the three-in-one trimmer head of the present disclosure which includes both flail blades and discrete strings.

Turning to FIG. 1, the three-in-one trimmer head of the present disclosure is generally designated by the numeral 10 and includes a body portion 12 to which is releasably connected discrete strings 14 and flail blades 16. The discrete strings 14 are connected to the body 12 by a clamping member of the type as disclosed in applicant's U.S. Pat. Nos. 5,758,424 and 5,896,666. The flail blades 16 are releasably connected to the body portion 12 by means of a snap fitting connection, as described in detail below.

Usually, the three-in-one trimmer head 10 is used in an embodiment which only includes the flail blades 16 for cutting high or thick vegetation. Each flail blade 16 is preferably made of a plastic material, although it may be made of metal, and is of sturdy construction so as to easily cut the thick vegetation. As shown in FIG. 1, the flail blades 16 include teeth 18 which aid in the cutting of high vegetation.

Figure 2A:
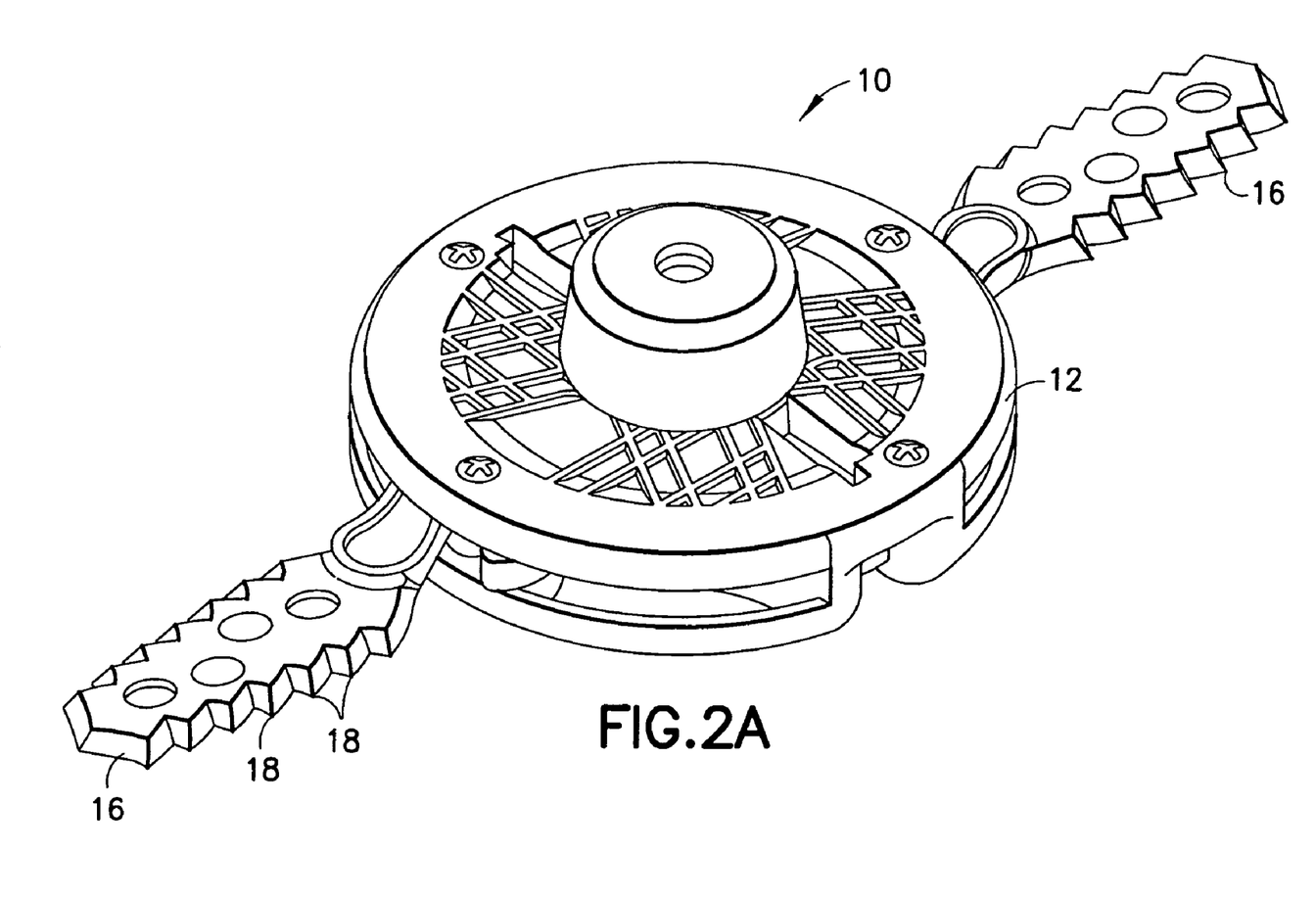
FIG. 2A is a perspective view of the three-in-one trimmer head of the present disclosure in the embodiment where only flail blades are attached to the trimmer head.

The embodiment in which the flail blades 16 only are used is illustrated in FIG. 2A. Because of the sturdiness of the flail blades 16, the configuration as shown in FIG. 2A is not used when trimming is to take place close to wall structures wherein a flail blade 16 may contact the wall and break, thereby possibly causing injury to the operator.

Figure 2B:
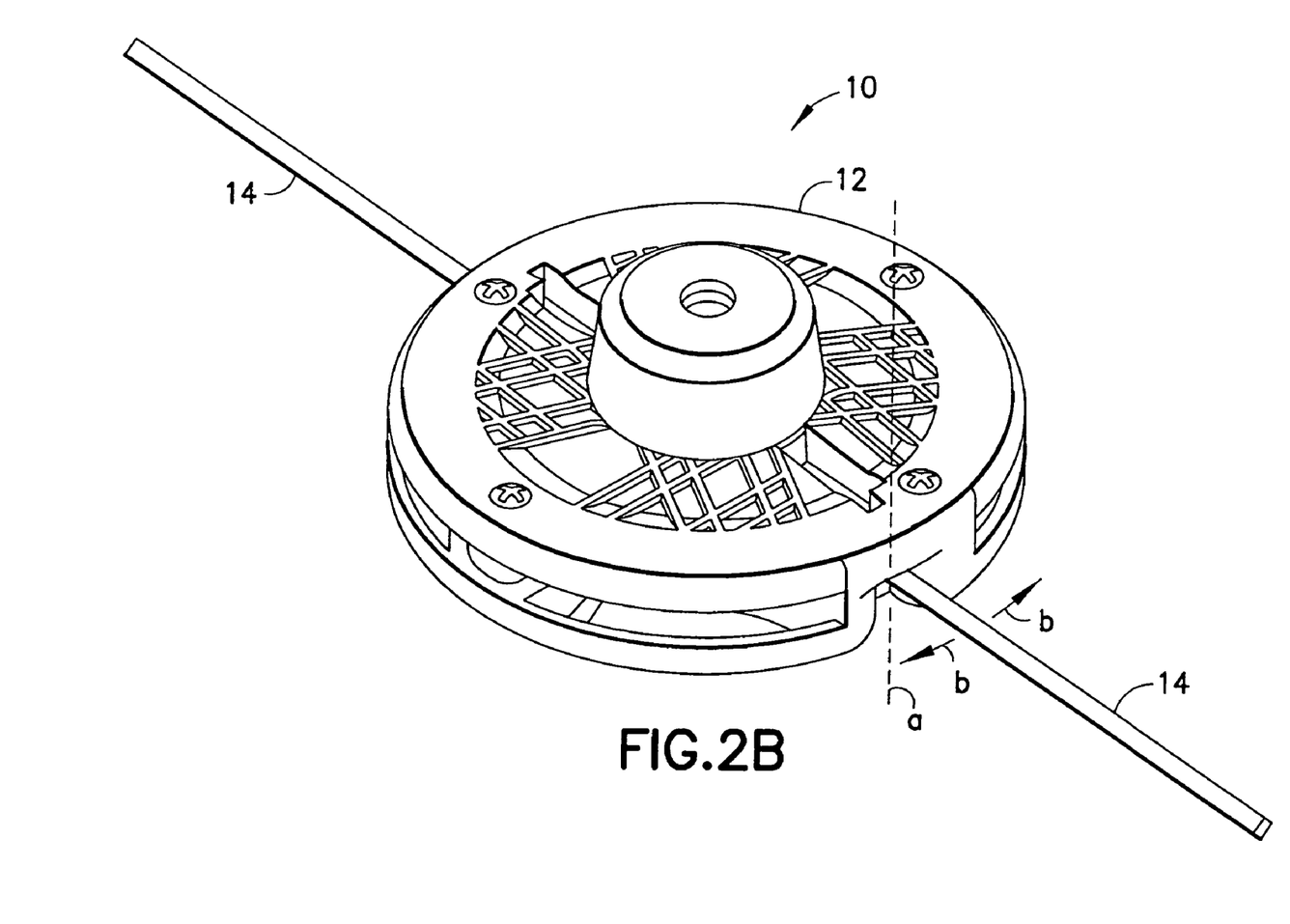
FIG. 2B is a perspective view of the three-in-one trimmer head of the present disclosure in the embodiment where only discrete strings are attached to the trimmer head.

When it is desired to trim vegetation along an edge or near a wall or similar structure, the flail blades 16 will be disconnected from the body 12, and discrete strings 14 will be inserted into the trimmer head 10 by a clamping mechanism of the type disclosed in applicant's U.S. patents as identified above. The embodiment in which the discrete strings 14 only are used is illustrated in FIG. 2B.

Figure 2C:
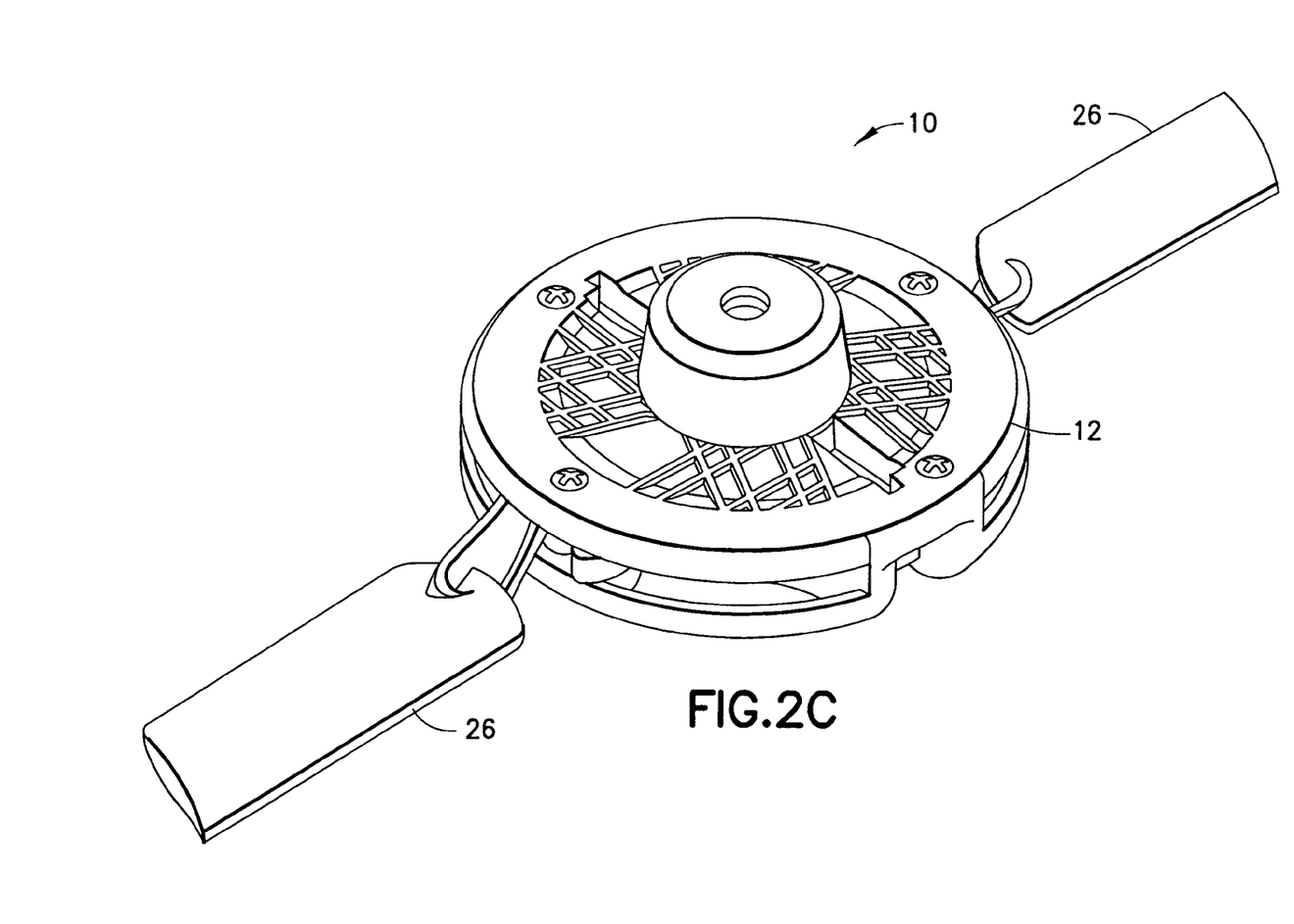
FIG. 2C is a perspective view of the three-in-one trimmer head of the present disclosure in the embodiment where only fan blades are attached to the trimmer head.

Furthermore, after the vegetation has been cut, the discrete strings 14 will be disconnected from the body 12 and fan blades 26 may be coupled to the body, as shown in FIG. 2C, to blow the cut vegetation to an area for easy pickup.

Figure 3:
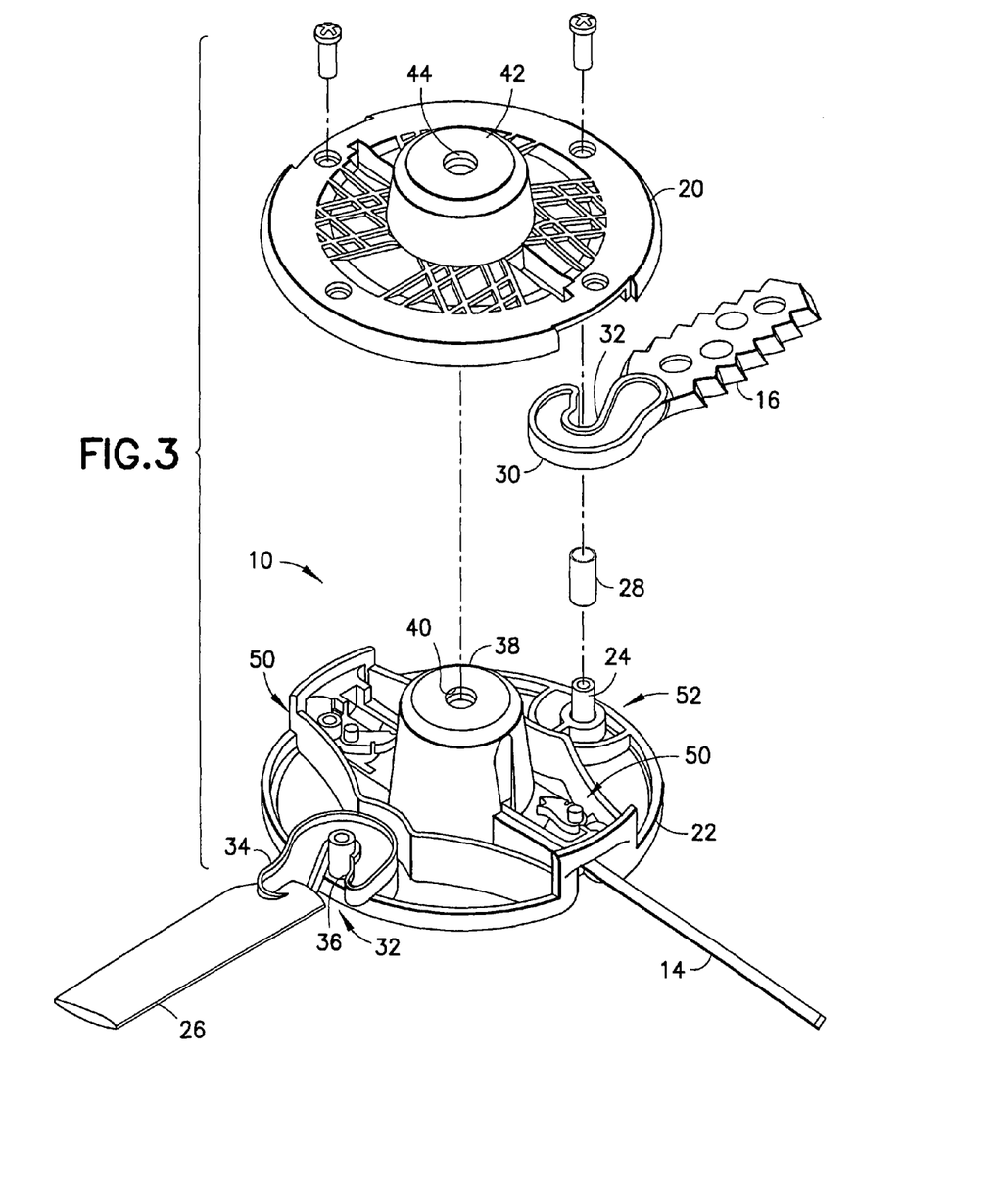
FIG. 3 is an exploded perspective view of the trimmer head of the present disclosure illustrating a flail blade, a discrete string, and a fan blade.

Referring to FIG. 3, the generally cylindrical body portion 12 includes an upper part or cover 20 and a lower portion or disc-shaped base plate 22. The base plate 22 is preferably formed with a circular shape. Alternatively, the base plate 22 can be formed with any shape that allows the base plate 22 to rotate about its center in a balanced state. For example, the base plate 22 can be formed as a rectangle or a star with equally-spaced points. It is to be appreciated that the upper part or cover 20 will be formed with the corresponding shape. Also, the cutting head 10 can be formed to various sizes by cutting the cover 20 and base plate 22 to the desired dimensions.

The disc-shaped base plate 22 is formed with a central hub 38. The hub 38 is frustoconically shaped and extends from the base plate 22 in a single direction. A drive shaft aperture 40 is formed in the hub 38 and dimensioned to allow a drive shaft to pass therethrough. The cover 20 includes a corresponding hub 42 and drive shaft aperture 44. When the body 12 is assembled, the drive shaft may be secured to the body 12 by any conventional coupling or coupling means via apertures 40 and 44.

The generally cylindrical body 12 includes a first pair of diametrically opposed apertures 46 disposed on a periphery of the body and a second pair of diametrically opposed apertures 48 disposed on the periphery. It is to be appreciated that the first and second pairs are located on the periphery of the body so the body will rotate about its center in a balanced state. A clamping member 50 is disposed in the body adjacent to each aperture of the first diametrically opposed pair 46 configured for retaining a cutting string 14, the details of which will be described below. A holding member 52 is disposed in the body adjacent to each aperture of the second diametrically opposed pair 48 configured for retaining at least one blade. As will be described below, the blade may be a flail blade or a fan blade.

With reference to FIG. 3, the holding member 52 will be described. The lower portion 22 of the body 12 includes posts 24 projecting from the lower portion 22 for rotatably engaging either a flail blade 16 or a fan blade 26. Disposed about each post 24 is a steel sleeve 28 which facilitates rotational movement of either the flail blade 16 or the fan blade 26.

As shown in FIG. 3, each flail blade 16 includes a clamping portion 30 of generally U-shaped configuration having a restricted entranceway 32 to enable the flail blade 16 to be snapped about a steel sleeve 28. Similarly, each fan blade 26 includes a U-shaped clamping portion 34 having a restricted entranceway 36 for enabling the fan blade 26 to be snapped onto a steel sleeve 28. The body 12 is designed such that either flail blades 16 or fan blades 26 may be snapped into place within the body, without requiring disassembly of the upper portion 20 of the body 12 from the lower portion 22.

Figure 4:
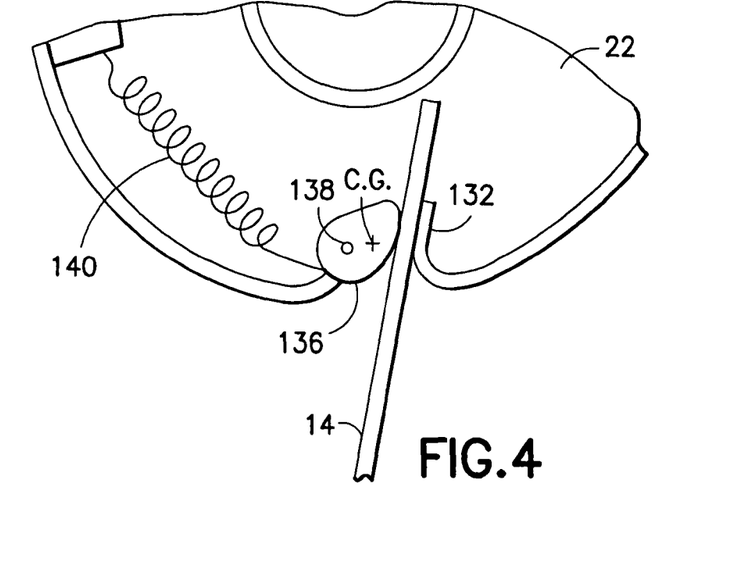
FIG. 4 is a partial view of a string clamped by a clamping member according to an embodiment of the present disclosure.

The clamping mechanism which is employed for attaching the discrete strings 14 to the body 12 are designated by the numeral 50. Exemplary clamping members are shown and described in U.S. Pat. Nos. 5,758,24 and 5,896,666, the contents of which are incorporated by reference. FIGS. 3-6 of U.S. Pat. Nos. 5,758,24 and 5,896,666 are reproduce here as FIGS. 4-7 for clarity. Referring to FIG. 4, cam 136 is pivotally mounted to post 138 which extend from the base plate 22. The cam 136 is mounted so that the top surface of the cam is below the height of a pressing walls 132 formed in the base plate 22. Spring 140 is provided to bias the cam 136. The cam 136 is formed and mounted onto the posts 138 so that the center of gravity of the cam 136 is located at a point between the corresponding post 138 and the pressing wall 132, as shown in FIG. 4 with the center of gravity indicated by "C. G.". The spring 140 is secured to the cam 136 such that the cam 136 are urged in a clockwise direction into contact with the pressing wall 132. The spring 140 creates the lesser degree of clamping force which is capable of maintaining the string 14 between the cam 136 in the pressing wall 132. The spring force of the spring 140 is selected to allow counter-clockwise rotation of the cam 136 with the insertion of the strings 14 into the cutting head 10 from a location outside the body 12. The rotation of the cutting head 10 during use, in either a clockwise or counter-clockwise direction, creates a centrifugal force which acts on the centers of gravity of the cam 136 and creates torque about the post 138 which cause the cam 136 to come into tighter engagement with the strings 14. Also, the centrifugal force radially extends the strings 14 and causes a thinning effect with the cross-section of the strings 14 being slightly reduced, thereby allowing the spring 140 and the torque acting on the cam 136 to urge the cam 136 into closer engagement with the pressing wall 132 and create an even tighter engagement of the cam 136 and the pressing wall 132 about the strings 14.

Figure 5:
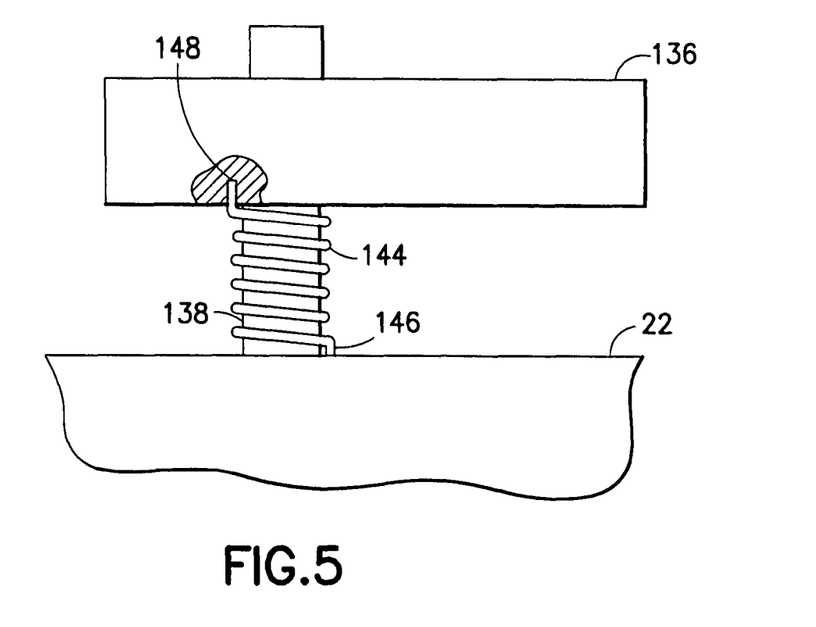
FIG. 5 is a partial view of a string clamped by a clamping member according to another embodiment of the present disclosure.

In another embodiment of clamping members 50, torsional springs 144 may be employed about the post 138 as shown in FIG. 5 in place of the coil spring 140. One end 146 of the torsional spring 144 is secured to base plate 22 with the other end 148 being secured to the cam 136 as shown in the cutaway section of FIG. 5. The end 148 urges the cam 136 in a clockwise direction about the post 138.

Figure 6:
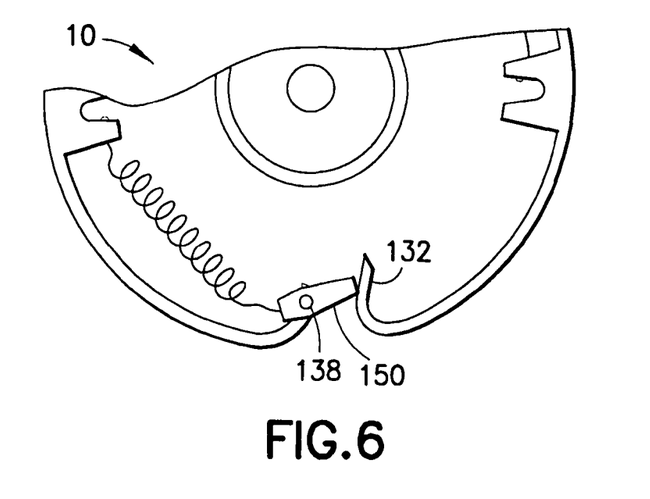
FIG. 6 is a partial view of a string clamped by a clamping member according to a further embodiment of the present disclosure.

Alternatively, the cam 136 can be substituted for a different-shaped clamping member. As shown in FIG. 6, a cylindrical rod 150 may be pivotally mounted to the post 138 with its center of gravity located between the post 138 and the pressing wall 132. Any shaped clamping member may be used with the present disclosure so long as it is formed with its center of gravity disposed between the post 138 and the pressing wall 132 and comprises an edge or face which can cooperate with the pressing wall 132 to clamp the string 14.

Figure 7:
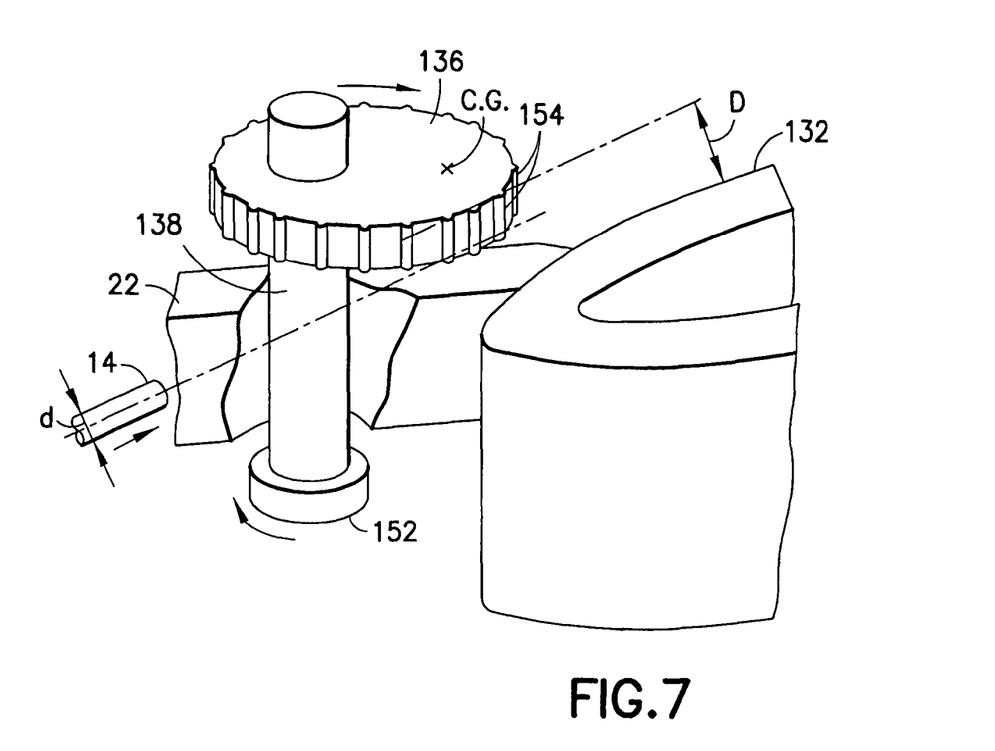
FIG. 7 is a partial view of a string clamped by a clamping member according to yet another embodiment of the present disclosure.

In a further embodiment of the clamping members, the cutting head 10 may be formed with the cam 136 capable of frictionally engaging the strings 14 without the use of the spring 140. As shown in FIG. 7, the post 138 may extend through the base plate 22, or through the cover 20, not shown. A handle 152 is provided at the end of the post 138 opposite the cam 136. The cam 136 may be manually rotated about the post 138 by rotating the handle 152. The cam 136 forms an opening with the pressing wall having a width "D" which may be varied. The width "D" is measured between the closest points of the cam 136 and the pressing wall 132 and represents the narrowest cross-section of the opening. The string 14 is formed with a diameter "d". To dispose the string 14 within the cutting head 10, the cam 136 is rotated so that the width "D" of the opening is greater than the diameter "d" of the string 14. Once within the cutting head 10, the cam 136 is rotated to frictionally engage the string 14 and press the string 14 against the pressing wall 132, with the width "D" being less than the diameter "d" of the string 14. A plurality of spaced ribs 154 may be provided to enhance the frictional engagement of the cam 136 with the string 14. In use, the centrifugal force created by the rotation of the cutting head 10 acts on the center of gravity of the cam 136, indicated by "C. G.", to enhance the gripping engagement of the string 14. The rotation of the cutting head 10 causes the cam 136 to create a moment about the post 138 and clamp string 14 in tighter engagement.

Figure 8:
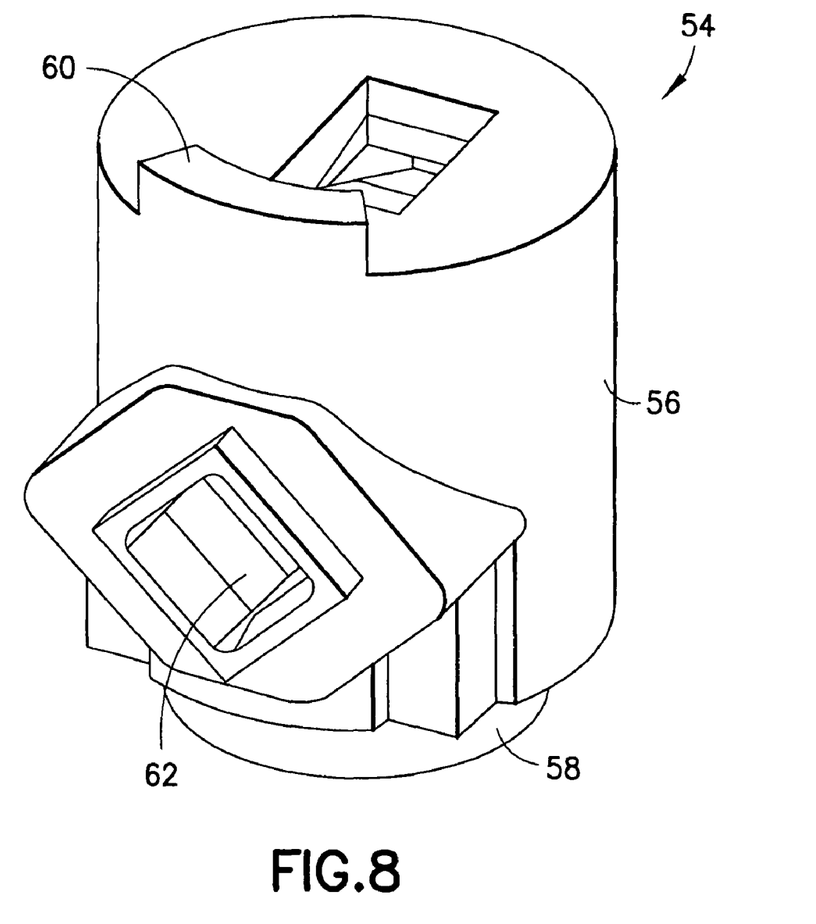
FIG. 8 is a perspective view of a rotatable clamp housing in accordance with an aspect of the present disclosure.

In a further embodiment, each clamping member 50 is mounted within a rotatable clamp housing 54 within the body 12, such that, as a string 14 encounters a solid object, the clamping member 50 and its associated housing 54 are rotated about a generally vertical axis so as to obviate or minimize the development of a stress concentration in the string in the vicinity at which it is engaged by the clamp housing, as described in commonly owned U.S. patent application Ser. No. 11/086,082 filed, the contents of which are incorporated by reference. Each rotatable clamp housing 54 is rotatable about an axis, designated "a" in FIG. 2B, extending perpendicular to or generally vertical to the cover 20 and base plate 22. Referring to FIG. 8, the rotatable housing 54 includes a generally cylindrically shaped housing 56, the lower end of which includes a circular support portion 58 of smaller diameter than the cylindrically shaped housing 56. Extending from the upper end of the cylindrically shaped housing 56 is a curved tang 60 which provides a stop for limiting the amount of angular rotation of the rotatable clamp housing 54 about the axis "a" within the cutter head 10. Each rotatable clamp housing 54 is mounted within the cutting head 10 with the circular support portion 58 being rotatably supported within a circular opening provided in the base plate 22. The curved tang 60 of each rotatable clamp housing 54 is accommodated in a curved recess within the upper cover 20, with the curved recess extending about 180 degrees, thus enabling the rotatable clamp housing 54 to be rotated 90 degrees about axis "a" in either direction (as indicated by arrows "b") from the neutral position as shown in FIG. 2B. The rotatable clamp housing 54 further includes an aperture 62 for receiving the string 14 and guiding the string to the clamping member disposed in the housing 54.

Usually, when high vegetation has to be cut, the configuration of the three-in-one trimmer head 10 is as illustrated in FIG. 2A, with the flail blades 16 being connected to the body 12. The cutter head 10 is rotationally driven by a motor, not shown, through a drive shaft which spins the trimmer head 10 at a velocity sufficient to cut through the thick vegetation.

In order for the trimmer head to be used adjacent walls or for cutting edges of a vegetation area, the flail blades are easily and quickly disconnected from the body 12 and discrete strings 14 are connected to the body 12, as shown in FIG. 2B.

For purposes of blowing debris or cuttings away from walkways and sidewalks, next, the strings 14 would be removed from the head 10, and two fan blades 26, diametrically opposed, would be snapped onto the trimmer head, as shown in FIG. 2C. At that time, upon rotation of the trimmer head, sufficient blowing air would be generated by the fan blades for blowing debris from walkways, etc.

For certain applications, the operator may have both the flail blades 16 and the discrete strings 14 connected to the trimmer head 10, as shown in FIG. 1.

Thus, there has been shown and described an improved three-in-one trimmer head which does not require disassembly in order to accommodate flail blades, fan blades, and discrete nylon strings. The configuration of the subject three-in-one trimmer head may be quickly and rapidly changed, merely by snapping in either the flail blades or the fan blades, or by inserting discrete strings into the clamping mechanism of the present disclosure. There is no need to remove the cover 20 of the body 12 in order to change the configuration of the trimmer head. Many changes, modifications, variations and other uses and applications of the present disclosure will, however, become apparent to those skilled in the art after considering the foregoing specification taken together with the accompanying drawings. All such changes, modifications, variations and other uses and applications which do not depart from the spirit and scope of the disclosure are deemed to be covered by the present disclosure.

What is claimed is:

1. A cutting head for a rotary trimmer, the cutting head being selectively rotationally driven through a drive shaft, the cutting head comprising:
   a generally cylindrical body having first and second pairs of diametrically opposed apertures disposed on a periphery of the body;
   at least one clamping member disposed in the body adjacent to each aperture of the first diametrically opposed pair configured for releasably retaining at least one cutting string; and
   at least one blade having an open u-shaped clamping portion being open to a lateral side of the blade for snap connecting to a trimmer head; and
   at least one holding member having a post disposed in the body adjacent to each aperture of the second diametrically opposed pair and a sleeve disposed on the post, the sleeve being between the blade and post and configured for releasably retaining at least one blade to facilitate rotation of the at least one blade.

2. The cutting head as in claim 1, wherein the at least one blade is a flail blade or a fan blade.

3. The cutting head as in claim 1, wherein the first and second pairs of diametrically opposed apertures are equally spaced along the periphery of the body.

4. The cutting head as in claim 1, wherein the at least one clamping member is a cam configured to contact a pressing wall.

5. The cutting head as in claim 4, wherein the cam is biased to contact the pressing wall by a spring.

6. The cutting head as in claim 1, wherein each of the at least one clamping member is disposed in a clamp housing, the clamp housing being rotatable about an axis extending generally perpendicular to the body.

7. A cutting head for a rotary trimmer, the cutting head being selectively rotationally driven through a drive shaft, the cutting head comprising:
- a generally cylindrical body having base plate and cover;
- two diametrically opposed clamping members disposed about a periphery of the body, each clamping member configured for releasably retaining a cutting string;
- at least one blade including an open U-shaped clamping portion being open to a lateral side of the blade for snap connecting to a trimmer head;
- two diametrically opposed holding members disposed about the periphery of the body, each holding member including a post extending between the base plate and the cover, the post being configured for releasably and rotatably retaining the U-shaped clamping portion of the at least one blade.

8. The cutting head as in claim 7, further comprising a sleeve disposed on the post configured to facilitate rotation of the at least one blade.

9. The cutting head as in claim 8, wherein the U-shaped clamping portion is configured to engage the sleeve.

10. The cutting head as in claim 7, wherein the at least one blade is a flail blade or a fan blade.

11. The cutting head as in claim 7, wherein the clamping members and the holding members are equally spaced along the periphery of the body.

12. The cutting head as in claim 7, wherein each of the at least one clamping member is disposed in a clamp housing, the clamp housing being rotatable about an axis extending generally perpendicular to the base plate and cover.

* * * * *